(12) United States Patent
Kappi

(10) Patent No.: US 12,471,055 B2
(45) Date of Patent: Nov. 11, 2025

(54) METHODS AND APPARATUSES FOR HIGH-PRECISION POSITIONING USING FLOATING CLOCK MODELS

(71) Applicant: HERE GLOBAL B.V., Eindhoven (NL)

(72) Inventor: Jani Kappi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 270 days.

(21) Appl. No.: 18/344,254

(22) Filed: Jun. 29, 2023

(65) Prior Publication Data
US 2025/0008481 A1    Jan. 2, 2025

(51) Int. Cl.
*H04W 64/00*  (2009.01)
*H04W 56/00*  (2009.01)

(52) U.S. Cl.
CPC ..... *H04W 64/006* (2013.01); *H04W 56/0035* (2013.01)

(58) Field of Classification Search
CPC ...... H02M 3/07; H02M 1/0058; H02M 1/007; H02M 3/01; H02M 3/077; Y02B 70/10
USPC ..................................... 455/456.6
See application file for complete search history.

(56) References Cited

U.S. PATENT DOCUMENTS

| 5,758,288 | A | * | 5/1998 | Dunn | G01S 5/10 |
| | | | | | 455/406 |
| 6,268,824 | B1 | * | 7/2001 | Zhodzishky | H04B 7/18552 |
| | | | | | 342/357.31 |
| 7,388,541 | B1 | * | 6/2008 | Yang | G01C 21/206 |
| | | | | | 342/464 |
| 7,602,811 | B2 | | 10/2009 | Porter et al. | |
| 7,813,311 | B2 | | 10/2010 | Dick et al. | |

(Continued)

FOREIGN PATENT DOCUMENTS

| CN | 100422760 | C | * | 10/2008 | ............. | G01S 19/29 |
| CN | 102474838 | A | * | 5/2012 | ........ | H04W 56/0045 |

(Continued)

OTHER PUBLICATIONS

Smaoui et al., "Anchor-oriented time and phase-based concurrent self-localization using UWB radios", 2021 IEEE 46th Conference on Local Computer Networks (LCN), (Oct. 4-7, 2021), 8 pages.

(Continued)

*Primary Examiner* — Mahendra R Patel
(74) *Attorney, Agent, or Firm* — ALSTON & BIRD LLP

(57) ABSTRACT

A method, apparatus and computer program product provide for frequency drift mitigation in a user equipment (UE). In the context of a method for mitigating frequency drift, the method modeling a base station clock with respect to a receiver clock so as to define the receiver clock at least partially based upon a frequency drift and a clock offset between the base station clock and the receiver clock to provide a floating frequency domain to compensate for the frequency drift between the base station clock and the receiver clock. The method also includes, based on modeling the base station clock with respect to the receiver clock, generating at least one timing offset of the receiver clock with respect to the base station clock. The method also includes determining a position of a UE associated with the receiver clock based at least partially upon the at least one timing offset.

17 Claims, 3 Drawing Sheets

(56) References Cited

U.S. PATENT DOCUMENTS

| | | | | |
|---|---|---|---|---|
| 7,925,274 | B2* | 4/2011 | Anderson | G01S 19/09 455/433 |
| 7,929,928 | B2* | 4/2011 | Babitch | H03J 7/065 331/18 |
| 8,085,196 | B2* | 12/2011 | Whitehead | G01S 19/40 342/357.44 |
| 8,436,768 | B2* | 5/2013 | Bull | G01S 5/02216 342/357.25 |
| 8,456,353 | B2* | 6/2013 | Dai | G01S 19/41 342/357.24 |
| 8,477,742 | B2* | 7/2013 | Grilli | H04W 56/001 370/336 |
| 9,250,327 | B2* | 2/2016 | Kelley | G01S 19/071 |
| 2004/0095264 | A1* | 5/2004 | Thomas | H02M 3/1582 341/53 |
| 2009/0093959 | A1* | 4/2009 | Scherzinger | G01S 19/44 356/3 |
| 2009/0182502 | A1* | 7/2009 | Riter | G01S 19/40 701/472 |
| 2009/0224832 | A1* | 9/2009 | Fagg | H02J 7/345 330/277 |
| 2010/0295379 | A1* | 11/2010 | Garcia | H02J 7/345 307/109 |
| 2013/0235864 | A1* | 9/2013 | Do | H04W 4/02 370/350 |
| 2013/0332072 | A1* | 12/2013 | Janky | G01S 19/40 701/469 |
| 2014/0191568 | A1* | 7/2014 | Partovi | H02J 50/60 307/31 |
| 2014/0240170 | A1* | 8/2014 | Rudow | G01S 19/07 342/357.42 |
| 2015/0301191 | A1* | 10/2015 | Wallace | G01S 19/32 342/357.42 |
| 2016/0007308 | A1 | 1/2016 | Do et al. | |
| 2016/0118906 | A1* | 4/2016 | Freeman | H02M 3/33515 363/21.05 |
| 2022/0216892 | A1 | 7/2022 | Bollard | |
| 2023/0262647 | A1 | 8/2023 | Ren et al. | |
| 2025/0048327 | A1* | 2/2025 | Thomas | H04W 64/00 |

FOREIGN PATENT DOCUMENTS

| | | | | |
|---|---|---|---|---|
| CN | 103262400 | A * | 8/2013 | H02M 1/0058 |
| CN | 115567139 | A | 1/2023 | |
| CN | 115623435 | A * | 1/2023 | H04W 4/33 |
| EP | 1580570 | A2 * | 9/2005 | G01S 19/44 |
| EP | 3142430 | A1 | 3/2017 | |
| EP | 2888801 | B1 * | 6/2020 | H02J 50/00 |
| WO | WO-2004047267 | A2 * | 6/2004 | H02M 3/1588 |
| WO | WO-2012128980 | A1 * | 9/2012 | G01S 19/43 |
| WO | WO-2014191760 | A1 * | 12/2014 | H02J 50/90 |
| WO | WO 2018/113997 | A1 | 6/2018 | |
| WO | WO-2021215949 | A1 * | 10/2021 | H02J 3/1842 |
| WO | WO 2022/001858 | A1 | 1/2022 | |

OTHER PUBLICATIONS

Extended European Search Report for European Application No. 24183314.4 dated Nov. 12, 2024, 9 pages.

Extended European Search Report received for corresponding European Patent Application No. 241833144, dated Nov. 12, 2024, 7 pages.

* cited by examiner

METHODS AND APPARATUSES FOR HIGH-PRECISION POSITIONING USING FLOATING CLOCK MODELS

TECHNOLOGICAL FIELD

An example embodiment relates generally to a technique for high-precision positioning, such as with, for example, fifth-generation (5G), sixth-generation (6G), and ultra-wideband radios and, more particularly, to a method, apparatus and computer program product that generates and utilizes floating clock models to mitigate frequency drift in user equipment.

BACKGROUND

Technical challenges in current 3GPP evolution path are related to limited bandwidth of positioning reference signals (PRS), density of PRS TRPs, limited number of antennas and array size per transmission/reception point (TRP) or extended reality (XR) device, long measurement time, limited performance in Non-Line-of-Sight conditions, limited use of radio access technology (RAT)-independent and hybrid positioning methods, and limited support for sensor information in positioning the user with six degrees of freedom (6DOF).

High-precision observed time difference of arrival (OT-DOA) implementations require time synchronization of the associated base station clocks. Time synchronization deviation (e.g., frequency drift) between base clocks limits the achievable accuracy of the positioning solution. In addition, the frequency drift in base clock synchronization causes timing biases and thus increases error in the measurements.

To mitigate the frequency drift issues, previous positioning solutions typically rely on multi-round trip time (RTT) techniques that demonstrate technical disadvantages such as high resource requirements and limited throughout. A further challenge in current positioning procedures relates to location service design that is based on request-and-response process. In this process the seamless tracking of user location and pose is not supporting the requirement of high-rate feedback of location information nor handovers between network cells.

BRIEF SUMMARY

A method, apparatus, and computer program product are provided in accordance with an example embodiment in order to provide for frequency drift mitigation in user equipment, such as a vehicle navigation system or cellular communication device, based upon modeling a base station clock with respect to a receiver clock so as to define the receiver clock based upon a frequency drift and a clock offset between the base station clock and the receiver clock. In this regard, the method, apparatus and computer program product of an example embodiment can provide a floating frequency domain to compensate for the frequency drift between the base station clock and the receiver. In an example embodiment, based on modeling the base station clock with respect to the receiver clock, the method, apparatus, and computer program product may generate at least one timing offset of the receiver clock with respect to the base station clock By generating and then relying upon the at least one timing offset to determine a position of an associated user equipment, the present techniques mitigate time synchronization errors, thereby generating a more accurate positioning solution in a more resource-efficient manner.

In an example embodiment, an apparatus is provided that is configured to mitigate frequency drift. The apparatus includes processing circuitry and at least one memory including computer program code with the at least one memory and the computer program code configured to, with the processing circuitry, cause the apparatus at least to model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock. The at least one memory and the computer program code are also configured to, with the processing circuitry, cause the apparatus to, based on modeling the base station clock with respect to the receiver clock, generate at least one timing offset of the receiver clock with respect to the base station clock. The at least one memory and the computer program code are also configured to, with the processing circuitry, cause the apparatus to determine a position of a user equipment (UE) associated with the receiver clock based at least partially upon the at least one timing offset.

The at least one memory and the computer program code are configured to, with the processing circuitry, cause the apparatus of an example embodiment to model the base station clock with respect to the receiver clock at least in part by generating a modeling filter for the base station clock. The at least one memory and the computer program code are configured to, with the processing circuitry, cause the apparatus of an example embodiment to, in response to receiving an observation of clock information from the base station clock, generate the at least one timing offset further based on the observation of clock information from the base station clock and also based on the modeling filter. The at least one memory and the computer program code are configured to, with the processing circuitry, cause the apparatus to, in response to receiving an observation of clock information from the base station clock, update the modeling filter based on the observation of clock information from the base station clock. In an example embodiment, the modeling filter is a Bayesian filter. In a particular example embodiment, the Bayesian filter is at least one of a Kalman filter (KF) or an extended Kalman filter (EKF). In another example embodiment, the modeling filter is a non-Bayesian filter. In another example embodiment, the modeling filter is at least one of a non-Gaussian generalized variational inference (GVI)-based filter or an adaptive filter. In a particular example embodiment, the modeling filter is a least mean squares filter or a recursive least squares filter. In another example embodiment, the modeling filter is a non-Bayesian Wiener filter. In another example embodiment, the modeling filter includes or embodies one or more artificial intelligence (AI) or machine learning (ML) models previously trained to model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock.

The at least one memory and the computer program code are further configured to, with the processing circuitry, cause the apparatus of an example embodiment to initialize the clock offset based on an observed value. In an example embodiment, the at least one memory and the computer program code are further configured to, with the processing circuitry, cause the apparatus to, in response to determining the base station has transitioned from the available state to an unavailable state, store a filter state including the frequency drift and the clock offset in association with an identifier for the base station. In an example embodiment, the at least one memory and the computer program code are further configured to, with the processing circuitry, cause the apparatus to, in response to determining the base station has transitioned from the unavailable state to the available state, restore a filter state for modeling the base station clock with respect to the receiver clock based upon the filter state that has been stored including the frequency drift and the clock offset.

The at least one memory and the computer program code are further configured to, with the processing circuitry, cause the apparatus of an example embodiment to separately model each of a plurality of base stations with respect to the receiver clock based upon a frequency drift and a clock offset between the base station clock of a respective base station of the plurality of base stations and the receiver clock in order to provide the floating frequency domain to compensate for the frequency drift between the base station clock of the respective base station and the receiver clock. The at least one memory and the computer program code are also configured to, with the processing circuitry, cause the apparatus to, based on separately modeling the base station clock of each of the plurality of base stations with respect to the receiver clock, separately generate at least one timing offset of the receiver clock for each of the plurality of base stations, where each of the at least one timing offset of the receiver clock is generated with respect to the base station clock of a corresponding one of the plurality of base stations. In an example embodiment, the position of the UE associated with the receiver clock is determined based at least partially upon the at least one timing offset for each of the plurality of base stations.

In another example embodiment, a method is provided for frequency drift mitigation in user equipment. The method includes modeling a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock. Based on modeling the base station clock with respect to the receiver clock, the method further includes generating at least one timing offset of the receiver clock with respect to the base station clock. Based at least partially upon the at least one timing offset, the method further determining a position of a user equipment (UE) associated with the receiver clock.

The method of an example embodiment models the base station clock with respect to the receiver clock by generating a modeling filter for the base station clock. In response to receiving an observation of clock information from the base station clock, the method of an example embodiment also includes generating the at least one timing offset further based on the observation of clock information from the base station clock and also based on the modeling filter. In an example embodiment, in response to receiving the observation of clock information from the base station clock, the method also includes updating the modeling filter based on the observation of clock information from the base station clock. In one example embodiment, the modeling filter is a Bayesian filter. In a particular example embodiment, the Bayesian filter is at least one of a Kalman filter (KF) or an extended Kalman filter (EKF). In another example embodiment, the modeling filter is a non-Bayesian filter. In another example embodiment, the modeling filter is at least one of a non-Gaussian generalized variational inference (GVI)-based filter or an adaptive filter. In a particular example embodiment, the modeling filter is a least mean squares filter or a recursive least squares filter. In another example embodiment, the modeling filter is a non-Bayesian Wiener filter. In another example embodiment, the modeling filter includes or embodies one or more artificial intelligence (AI) or machine learning (ML) models previously trained to model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock.

The method of an example embodiment further includes initializing the clock offset based on an observed value. In response to determining the base station has transitioned from the available state to an unavailable state, the method of an example embodiment also includes storing a filter state including the frequency drift and the clock offset in association with an identifier for the base station. In response to determining the base station has transitioned from the unavailable state to the available state, the method of an example embodiment further includes restoring a filter state for modeling the base station clock with respect to the receiver clock based upon the filter state that has been stored including the frequency drift and the clock offset.

The method of an example embodiment also includes separately modeling each of a plurality of base stations with respect to the receiver clock based upon a frequency drift and a clock offset between the base station clock of a respective base station of the plurality of base stations and the receiver clock in order to provide the floating frequency domain to compensate for the frequency drift between the base station clock of the respective base station and the receiver clock. Based on separately modeling the base station clock of each of the plurality of base stations with respect to the receiver clock, the method of an example embodiment further includes separately generating at least one timing offset of the receiver clock for each of the plurality of base stations, where each of the at least one timing offset of the receiver clock is generated with respect to the base station clock of a corresponding one of the plurality of base stations. In an example embodiment of the method, the position of the UE associated with the receiver clock is determined based at least partially upon the at least one timing offset for each of the plurality of base stations.

In an example embodiment, a computer program product is provided that is configured to provide for frequency drift mitigation in user equipment (UE). The computer program product includes at least one non-transitory computer-readable storage medium having computer-executable program code instructions stored therein with the computer-executable program code instructions including program code instructions configured to model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock. The computer-executable program code instructions also include program code instructions configured to, based on modeling the base station clock with respect to the receiver clock, generate at least one timing offset of the receiver clock with respect to the base station clock. The computer-executable program code instructions further include program code instructions configured to determine a position of a user equipment (UE) associated with the receiver clock based at least partially upon the at least one timing offset.

The computer-executable program code instructions of an example embodiment also include program code instructions configured to model the base station clock with respect to the receiver clock by generating a modeling filter for the base station clock. In an example embodiment, in response to receiving an observation of clock information from the base station clock, the computer-executable program code instructions further include program code instructions configured to generate the at least one timing offset further based on the observation of clock information from the base station clock and also based on the modeling filter. In an example embodiment, in response to receiving the observation of clock information from the base station clock, the computer-executable program code instructions further include program code instructions configured to update the modeling filter based on the observation of clock information from the base station clock. In an example embodiment, the modeling filter is a Bayesian filter. In a particular example embodiment, the Bayesian filter is at least one of a Kalman filter (KF) or an extended Kalman filter (EKF). In another example embodiment, the modeling filter is a non-Bayesian filter. In another example embodiment, the modeling filter is at least one of a non-Gaussian generalized variational inference (GVI)-based filter or an adaptive filter. In a particular example embodiment, the modeling filter is a least mean squares filter or a recursive least squares filter. In another example embodiment, the modeling filter is a non-Bayesian Wiener filter. In another example embodiment, the modeling filter includes or embodies one or more artificial intelligence (AI) or machine learning (ML) models previously trained to model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock.

The computer-executable program code instructions of an example embodiment further include program code instructions configured to initialize the clock offset based on an observed value. The computer-executable program code instructions of an example embodiment further include program code instructions configured to, in response to determining the base station has transitioned from the available state to an unavailable state, store a filter state including the frequency drift and the clock offset in association with an identifier for the base station. The computer-executable program code instructions of an example embodiment further include program code instructions configured to, in response to determining the base station has transitioned from the unavailable state to the available state, restore a filter state for modeling the base station clock with respect to the receiver clock based upon the filter state that has been stored including the frequency drift and the clock offset.

The computer-executable program code instructions of an example embodiment further include program code instructions configured to separately model each of a plurality of base stations with respect to the receiver clock based upon a frequency drift and a clock offset between the base station clock of a respective base station of the plurality of base stations and the receiver clock in order to provide the floating frequency domain to compensate for the frequency drift between the base station clock of the respective base station and the receiver clock. The computer-executable program code instructions of an example embodiment further include program code instructions configured to, based on separately modeling the base station clock of each of the plurality of base stations with respect to the receiver clock, separately generate at least one timing offset of the receiver clock for each of the plurality of base stations, where each of the at least one timing offset of the receiver clock is generated with respect to the base station clock of a corresponding one of the plurality of base stations. In an example embodiment, the computer-executable program code instructions include program code instructions configured to determine the position of the UE associated with the receiver clock based at least partially upon the at least one timing offset for each of the plurality of base stations.

In a further example embodiment, an apparatus is provided that is configured to provide for frequency mitigation in a user equipment (UE). The apparatus includes means for modeling a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock. The apparatus also includes means for, based on modeling the base station clock with respect to the receiver clock, generating at least one timing offset of the receiver clock with respect to the base station clock. The apparatus also includes means for determining a position of a user equipment (UE) associated with the receiver clock based at least partially upon the at least one timing offset.

The means for modeling the base station clock with respect to the receiver clock includes, in an example embodiment, means for generating a modeling filter for the base station clock. In an example embodiment, the apparatus also includes means, in response to receiving an observation of clock information from the base station clock, for generating the at least one timing offset further based on the observation of clock information from the base station clock and also based on the modeling filter. In an example embodiment, the apparatus also includes means for, in response to receiving an observation of clock information from the base station clock, updating the modeling filter based on the observation of clock information from the base station clock. In one example embodiment, the modeling filter is a Bayesian filter. In a particular example embodiment, the Bayesian filter is at least one of a Kalman filter (KF) or an extended Kalman filter (EKF). In another example embodiment, the modeling filter is a non-Bayesian filter.

The apparatus of an example embodiment also includes means for initializing the clock offset based on an observed value. In an example embodiment, the apparatus also includes means, in response to determining the base station has transitioned from the available state to an unavailable state, for storing a filter state including the frequency drift and the clock offset in association with an identifier for the base station. In an example embodiment, the apparatus further includes means, in response to determining the base station has transitioned from the unavailable state to the available state, for restoring a filter state for modeling the base station clock with respect to the receiver clock based upon the filter state that has been stored including the frequency drift and the clock offset. In an example embodiment, the apparatus also includes means for separately modeling each of a plurality of base stations with respect to the receiver clock based upon a frequency drift and a clock offset between the base station clock of a respective base station of the plurality of base stations and the receiver clock in order to provide the floating frequency domain to compensate for the frequency drift between the base station clock of the respective base station and the receiver clock. The apparatus, in an example embodiment, further includes means, based on separately modeling the base station clock of each of the plurality of base stations with respect to the receiver clock, for separately generating at least one timing offset of the receiver clock for each of the plurality of base stations, where each of the at least one timing offset of the receiver clock is generated with respect to the base station clock of a corresponding one of the plurality of base stations. In an example embodiment, the means for determining the position of the UE associated with the receiver clock includes means for determining the position of the UE associated with the receiver clock based where the position of the UE associated with the receiver clock is determined based at least partially upon the at least one timing offset for each of the plurality of base stations.

BRIEF DESCRIPTION OF THE DRAWINGS

Figure 1:
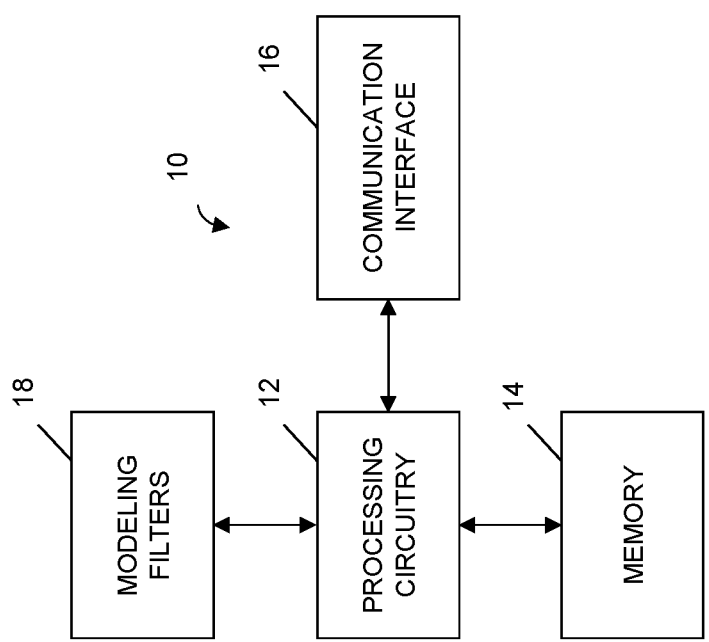
Figure 2:
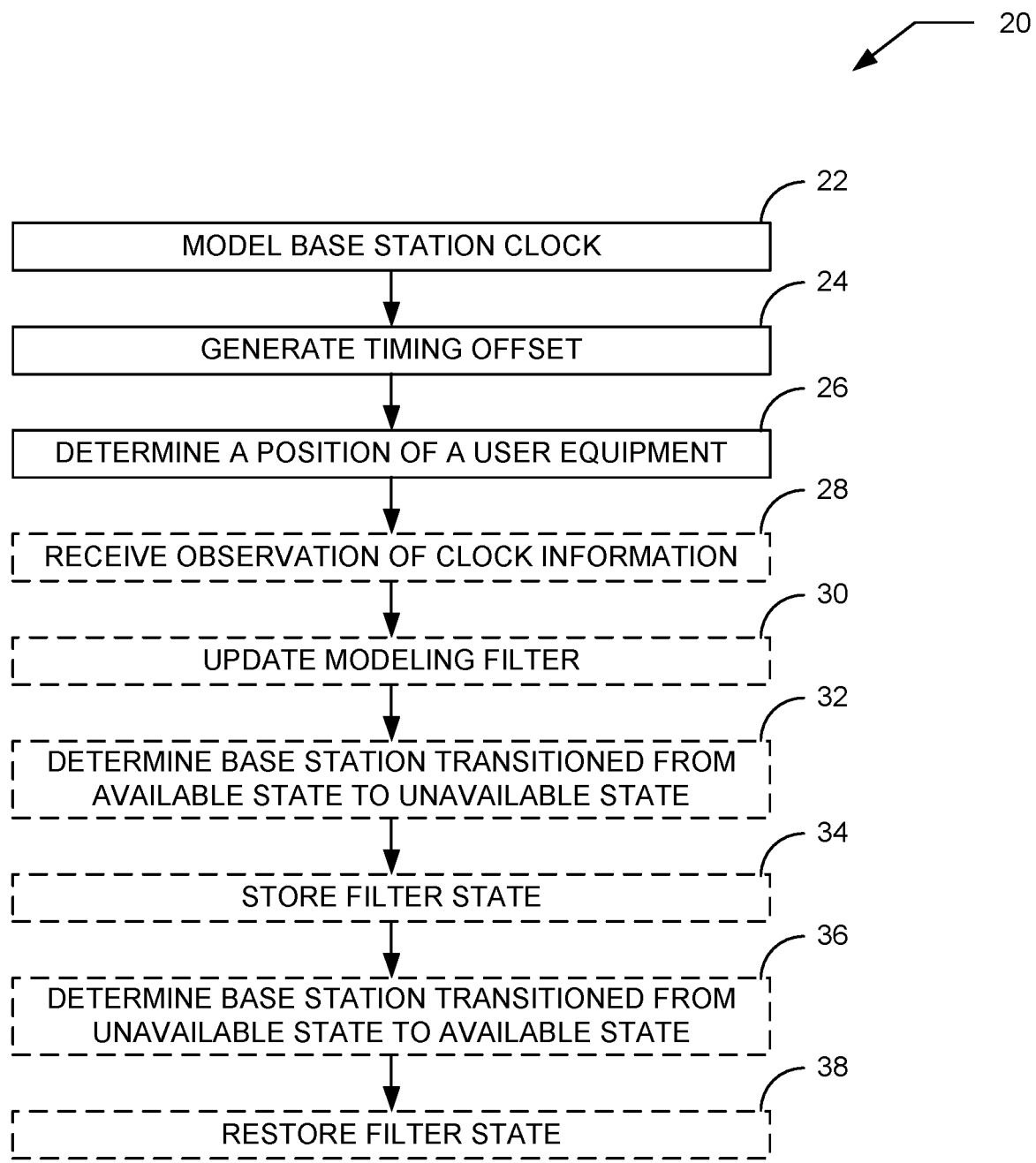
Figure 3:
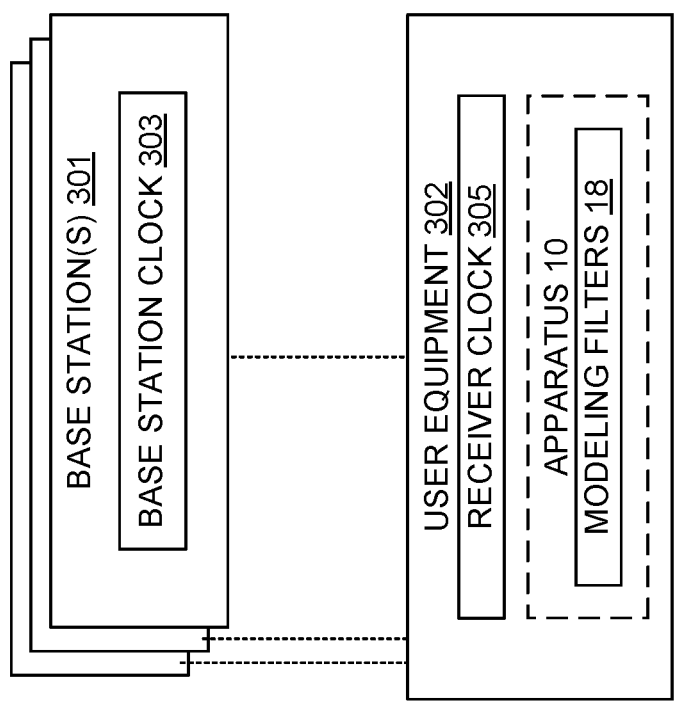

Having thus described example embodiments of the present disclosure in general terms, reference will now be made to the accompanying drawings, which are not necessarily drawn to scale, and wherein:

FIG. 1 is a block diagram of an apparatus that may be specifically configured in accordance with an example embodiment in order to mitigate frequency shift between a receiver clock and a base station clock in accordance with an example embodiment;

FIG. 2 is a flow chart illustrating the operations of a frequency drift mitigation workflow performed, such as by the apparatus of FIG. 2, in order to provide for frequency drift mitigation in a user equipment in accordance with an example embodiment of the present disclosure; and FIG. 3 is a block diagram of a user equipment and base station in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in order to mitigate frequency drift in a user equipment. In this regard, a method, apparatus and computer program product model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock. Utilizing the modeling of the base station clock with respect to the receiver clock, a timing offset of the receiver clock with respect to the base station clock may be generated and utilized to mitigate frequency drift. For example, the method apparatus, or computer program product determine a position of a user equipment (UE) based at least partially upon the timing offset, thereby eliminating or reducing errors in the position estimate due to frequency drift over time. In some example embodiments, the improved approaches to frequency drift mitigation described herein are applied to a plurality of observed stations simultaneously, thereby providing a floating frequency domain by which observed drift from each base station clock may be compensated.

Mobile cellular networks can facilitate terrestrial positioning services in addition to providing efficient data connectivity. For example, fifth-generation (5G), sixth-generation (6G), and/or ultra-wide-band telecommunication infrastructure may be configured to provide positioning accuracy of approximately one meter. Radio-based sensing capabilities may be integrated into cellular networks and corresponding UEs to further leverage the capabilities of millimeter-wave (mm-wave) transceiver systems. Cellular positioning approaches may include both uplink and downlink-based solutions, building on the corresponding existing reference signals of. Approaches for downlink may use dedicated positioning reference signal (PRS). Further, positioning and localization may be implemented using the existing demodulation reference symbols (DMRS) or, alternatively, synchronization signal blocks (SSBs). Approaches for uplink may use sounding reference signals (SRS) or DMRS. In the 5G telecommunication context, requirements for the time synchronization are increasingly critical and stringent. For example, time synchronization may be 3 microseconds (µs) in LTE and 5G (e.g., in terms of deviation from a common absolute time base of +/−1.5 µs), which increases costs and requires more hardware capacity at network base stations. To meet such requirements and overcome drawbacks to existing approaches, there exists a need for improved approaches for mitigating frequency drift so as to provide and maintain requisite time synchronization.

The frequency drift mitigation techniques described herein may be applied to asynchronous radio networks or networks that are not accurately enough synchronized to support high-precision positioning. For example, the frequency drift mitigation techniques described herein may be utilized in positioning and enhanced location services (eLCS) for positioning in cellular networks. In eLCS, positioning may be based on user equipment (UE)/base station (gNB) measurements and user equipment location may be computed in the location server (e.g., by a location management function (LMF)). Fifth and further generation telecommunication infrastructures may use previous high precision techniques, such as multi-round trip time (multi-RTT) to address positioning errors caused by synchronization offsets between base stations. However, such approaches consume base station resources and limit the number of simultaneous UEs that may access a corresponding telecommunication service. The present method, apparatus, and computer program product may overcome such technical shortcomings by mitigating frequency drift through generation of floating clock models configured to generate timing offsets for receiver clocks of UEs. Thus, the method, apparatus and computer program product of an example embodiment provides for improved positioning solutions that depend upon synchronization of the radio nodes, such as may be required in autonomous vehicles and high-precision indoor positioning of computing devices.

As shown in FIG. 1, in order to mitigate frequency shift in receiver stations of user equipment respective to a base station clock of one or more base stations, an apparatus 10 is provided that may be embodied by a computing device, such as the computing device that embodies a user equipment, including a receiver clock. Alternatively, the apparatus 10 may be embodied by a cloud-based computing system that is also in communication, directly or indirectly, with the UE. Regardless of the manner in which the apparatus 10 is embodied, the apparatus 10 of an example embodiment includes, is associated with or is in communication with processing circuitry 12, a memory device 14 and a communication interface 16.

In some embodiments, the processing circuitry 12 (and/or co-processors or any other processors assisting or otherwise associated with the processing circuitry 12) can be in communication with the memory device 14 via a bus for passing information among components of the apparatus 10. The memory device 14 can be non-transitory and can include, for example, one or more volatile and/or non-volatile memories. In other words, for example, the memory device 14 may be an electronic storage device (for example, a computer readable storage medium) comprising gates configured to store data (for example, bits) that can be retrievable by a machine (for example, a computing device like the processing circuitry 12). The memory device 14 can be configured to store information, data, content, applications, instructions, or the like for enabling the apparatus 10 to carry out various functions in accordance with an example embodiment of the present disclosure. For example, the memory device 14 can be configured to store one or more modeling filters 18. The modeling filter 18 includes, for example a Bayesian filter, such as a Kalman filter (KF), extended KF, particle estimator, or grid-based estimator. In another example embodiment, the modeling filter 18 includes a filter generated using a non-Gaussian-based Bayesian filtering technique or non-Gaussian-based generalized variational inference (GVI) filtering technique. In some embodiments, the modeling filter 18 is a non-Bayesian filter, such as an adaptive filter or a non-Bayesian Wiener filter. In an example embodiment, the modeling filter 18 includes or embodies a least mean squares filter or a recursive least squares filter. In some embodiments, the modeling filter 18 includes or embodies one or more artificial intelligence (AI) or machine learning (ML) models previously trained to model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock.

The modeling filter 18 may include one or more filter states. The memory device 14 can store, for example, a filter state in association with one or more identifiers, such as an identifier for a base station. The filter state may include, for example, a frequency drift between the base station clock and a receiver clock and a clock offset of the receiver clock with respect to the base station clock. Additionally, or alternatively, the memory device 14 can be configured to store instructions for execution by the processing circuitry 12.

The processing circuitry 12 can be embodied in a number of different ways. For example, the processing circuitry 12 may be embodied as one or more of various hardware processing means such as a processor, a coprocessor, a microprocessor, a controller, a digital signal processor (DSP), a processing element with or without an accompanying DSP, or various other processing circuitry 12 including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 12 can include one or more processing cores configured to perform independently. A multi-core processor can enable multiprocessing within a single physical package. Additionally, or alternatively, the processing circuitry 12 can include one or more processors configured in tandem via the bus to enable independent execution of instructions, pipelining and/or multithreading.

In an example embodiment, the processing circuitry 12 can be configured to execute instructions stored in the memory device 14 or otherwise accessible to the processing circuitry 12. Alternatively, or additionally, the processing circuitry 12 can be configured to execute hard coded functionality. As such, whether configured by hardware or software methods, or by a combination thereof, the processing circuitry 12 can represent an entity (for example, physically embodied in circuitry) capable of performing operations according to an embodiment of the present disclosure while configured accordingly. Thus, for example, when the processing circuitry 12 is embodied as an ASIC, FPGA or the like, the processing circuitry 12 can be specifically configured hardware for conducting the operations described herein. Alternatively, as another example, when the processing circuitry 12 is embodied as an executor of software instructions, the instructions can specifically configure the processing circuitry 12 to perform the algorithms and/or operations described herein when the instructions are executed. However, in some cases, the processing circuitry 12 can be a processor of a specific device (for example, a computing device) configured to employ an embodiment of the present disclosure by further configuration of the processor by instructions for performing the algorithms and/or operations described herein. The processing circuitry 12 can include, among other things, a clock, an arithmetic logic unit (ALU) and/or one or more logic gates configured to support operation of the processing circuitry 12.

The apparatus 10 of an example embodiment can also include the communication interface 16. The communication interface can be any means such as a device or circuitry embodied in either hardware or a combination of hardware and software that is configured to receive and/or transmit data from/to other electronic devices in communication with the apparatus 10. The communication interface can be configured to communicate in accordance with various wireless protocols including Global System for Mobile Communications (GSM), such as but not limited to Long Term Evolution (LTE), Fifth-Generation (5G) telecommunications protocols or the like. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Referring now to FIG. 2, shown is an example frequency drift mitigation workflow 20 according to one embodiment of the present disclosure. The operations of the workflow 20 are performed by the apparatus 10 of FIG. 1 to mitigate frequency shift in receiver stations of user equipment respective to one or more base stations are depicted. The operations of the workflow 20 are depicted in blocks 22-38 shown in FIG. 2. The workflow 20 may initiate at block 22. In some embodiments, one or more operations of FIG. 2 are combined or omitted. For example, potential optional operations of the workflow 20 are indicated in FIG. 2 by blocks depicted in dashed lines.

At block 22, the apparatus 10 of an example embodiment includes means, such as the processing circuitry 12, to model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock. For example, as shown in FIG. 3, the apparatus 10 models a base station clock 303 of a base station 301 with respect to a receiver clock 305 of a user equipment (UE) 302 so as to define the receiver clock 305 at least partially based upon a frequency drift and a clock offset between the base station 301 and the UE 302.

In some embodiments, to model the base station clock with respect to the receiver clock, the apparatus 10 includes means, such as the processing circuitry 12, to generate a modeling filter for the base station clock, such as a modeling filter 18 as shown in FIG. 1. In one example embodiment, the modeling filter is a Bayesian filter. For example, the modeling filter may be a Kalman filter or an extended Kalman filter. In another example embodiment, the modeling filter is a non-Bayesian filter.

In some embodiments, to model the base station clock with respect to the receiver clock, the apparatus 10 includes means, such as the processing circuitry 12, to model the base station clock with respect to the receiver clock according to Equation 1, where u indicates the clock offset, x indicates the frequency drift, t indicates a time of the UE receiver clock, and C(t) indicates an adjusted time mitigated for frequency shift between the base station and the UE receiver clock. In some embodiments, the apparatus 10 includes means, such as the processing circuitry 12, to initialize the clock offset u as zero or initialize the clock offset based on an observed value, which may be received by the apparatus 10 by means such as the communication interface 16 and/or processing circuitry 12.

$$C(t) = (1 + x) * t + u \quad \text{(Equation 1)}$$

In some embodiments, at block 22, the apparatus 10 includes, such as the processing circuitry 12, to separately model each of a plurality of base stations with respect to the receiver clock based upon a frequency drift and a clock offset between the base station clock of a respective base station of the plurality of base stations and the receiver clock in order to provide the floating frequency domain to compensate for the frequency drift between the base station clock of the respective base station and the receiver clock.

At block 24, the apparatus 10 of an example embodiment includes means, such as the processing circuitry 12, to generate one or more timing offsets of the receiver clock with respect to the base station clock based on modeling the base station clock with respect to the receiver clock at block 22. In some embodiments, at block 24, based on separately modeling the base station clock of each of the plurality of base stations with respect to the receiver clock at block 22, the apparatus 10 includes means, such as the processing circuitry 12, to separately generate one or more timing offsets of the receiver clock for each of a plurality of base stations. For example, the apparatus 10 includes means, such as the processing circuitry 12, to generate a plurality of timing offsets of the receiver clock where each of the plurality of timing offsets is generated with respect to the base station clock of a corresponding one of the plurality of base stations. In some embodiments, at block 24, the apparatus 10 generates the timing offset according to Equation 1. In an example embodiment, the apparatus 10 includes means, such as the processing circuitry 12, to generate one or more timing offsets of the receiver clock respective to one or more base station clocks using a modeling filter 18 associated with the base station clock.

At block 26, the apparatus 10 of an example embodiment includes means, such as the processing circuitry 12, to determine a position of a user equipment (UE) associated with the receiver clock based at least partially upon the at least one timing offset. In some embodiments, at block 26, the apparatus 10 includes means, such as the processing circuitry 112, to determine the position of the UE associated with the receiver clock based at least partially upon the at least one timing offset for each of a plurality of base stations. In an example embodiment, the user equipment includes a vehicle and, at block 26, the apparatus 10 includes means, such as the processing circuitry 12, to determine a position of the vehicle based at least partially upon one or more timing offsets of the receiver clock of the vehicle respective to one or more base stations. In another example embodiment, the user equipment includes a cellular telephone and, at block 26, the apparatus 10 includes means, such as the processing circuitry 12, to determine a position of the vehicle based at least partially upon one or more timing offsets of the receiver clock of the cellular telephone respective to one or more base stations. In another example embodiment, the user equipment includes a wearable internet-of-things (IoT) device and, at block 26, the apparatus 10 includes means, such as the processing circuitry 12, to determine a position of the vehicle based at least partially upon one or more timing offsets of the receiver clock of the wearable IoT device respective to one or more base stations.

At block 28, the apparatus 10 of an example embodiment includes means, such as the processing circuitry 12, to receive an observation of clock information from the base station clock. In an example embodiment, the apparatus 10 includes means, such as the communication interface 16, to receive the observation of clock information, and means, such as the processing circuitry 12 and/or memory device 14, to store the base station clock information in association with local receiver clock information. In some embodiments, the apparatus 10 includes means, such as the memory device 14, to store a time series record of observed clock information from one or more base stations. In some embodiments, the apparatus 10 includes means, such as the communication interface 16 and/or processing circuitry 12, to store and retrieve observed clock information from a remote storage environment, such as a memory device external to a user equipment or a network-based cloud storage environment.

At block 30, the apparatus 10 of an example embodiment includes means, such as the processing circuitry 12, to update a modeling filter 18 based on the observation of clock information from the base station clock. In an example embodiment, the apparatus 10 includes means, such as the processing circuitry 12, to retrieve a stored modeling filter 18 for a base station clock and update the modeling filter 18 based on the observation of clock information from the base station clock. In some embodiments, the apparatus 10 includes means, such as the processing circuitry 10, to determine a clock difference based on the observation of clock information from the base station and the local receiver clock information. In some embodiments, at block 24, the apparatus 10 includes means, to generate the at least one timing offset further based on the observation of clock information from the base station clock and also based on the modeling filter. In an example embodiment, when a new observation of clock information is received, the apparatus 10 includes means, such as the processing circuitry 12, to determine a clock difference and generate, or update, a modeling filter 18. In an example embodiment, the apparatus 10 includes means, such as the processing circuitry 12, to initiate and update a modeling filter 18 for each of a plurality of base station clocks simultaneously (e.g., each base station clock being associated with a different base station). For example, the apparatus 10 includes means, such as the processing circuitry 12, memory device 14, and communication interface 16, to perform the workflow 20 respective to a receiver clock of a user equipment (UE) and a base station clock of each of a plurality of base stations.

At block 32, the apparatus 10 of an example embodiment includes means, such as the processing circuitry 12, to determine the base station has transitioned from the available state to an unavailable state. At block 34, in response to determining the base station has transitioned from the available state to an unavailable state, the apparatus 10 of an example embodiment includes means, such as the processing circuitry 12 and/or memory device 14, to store a filter state including the frequency drift and/or the clock offset in association with an identifier for the base station. In an example embodiment, the filter state corresponds to a current iteration of a modeling filter 18 respective to the base station clock. In some embodiments, the unavailable state refers to a state in which suitable means of the apparatus 10 (e.g., or associated UE), such as the communication interface 16, are unable to receive and transmit data with a base station. In some embodiments, the available state refers to a state in which the suitable means of the apparatus 10 are able to receive and transmit data with the base station.

At block 36, the apparatus 10 of an example embodiment includes means, such as the processing circuitry 12, to determine the base station has transitioned from the unavailable state to the available state. At block 38, in response to determining the base station has transitioned from the unavailable state to the available state, the apparatus 10 of an example embodiment includes means, such as the processing circuitry 12, to restore a filter state for modeling the base station clock with respect to the receiver clock based upon the filter state that has been stored including the frequency drift and the clock offset. In an example embodiment, the apparatus 10 includes means, such as the processing circuit 12 and/or memory device 14, to retrieve, and potentially update, a stored modeling filter 18 associated with a base station clock of a particular base station in response to determining the particular base station has transitioned from an unavailable state to an available state.

As described above with references to FIGS. 1-2 and as further shown in FIG. 3, a method, apparatus 10, and computer program product provide for frequency shift mitigation in a user equipment 302 based upon modeling a base station clock 303 with respect to a receiver clock 305 of the user equipment 302 so as to define the receiver clock 305 at least partially based upon a frequency drift and a clock offset between the base station clock 303 and the receiver clock 305 in order to provide a floating frequency domain to compensate for the frequency drift between the base station clock 303 and the receiver clock 305. In an example embodiment, the method, apparatus 10, and computer program product generate and update modeling filters 18 respective to base stations 301 to provide means for determining frequency shifts and clock offsets between the receiver clock 305 of the user equipment 302 and a base station clock 303 of one or more base stations 301. In this regard, the method, apparatus and computer program product of an example embodiment can then generate at least one timing offset of the receiver clock 305 with respect to the base station clock 303 in order to permit positioning services for the user equipment 302 to be more accurate and resource-efficient. By generating floating clock models, the user equipment is able to mitigate the impact of observed frequency drift, thereby reducing or eliminating a key source of error in key error sources in asynchronous or inadequately synchronized radio network, which may provide a more accurate and resource-efficient positioning solution.

As described above, FIG. 2 is a flow diagram of a workflow 20 by which an apparatus 10, method, and computer program product mitigate frequency shift in receiver stations of one or more user equipment respective to one or more base stations according to an example embodiment. It will be understood that each block of the flow diagrams, and combinations of blocks in the flow diagrams, may be implemented by various means, such as hardware, firmware, processing circuitry 12, and/or other devices associated with execution of software including one or more computer program instructions. For example, one or more of the procedures described above may be embodied by computer program instructions. In this regard, the computer program instructions which embody the procedures described above may be stored by the memory device 14 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the blocks of the flow diagrams. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flow diagrams.

Accordingly, blocks of the flow diagrams support combinations of means for performing the specified functions and combinations of operations for performing the specified functions. It will also be understood that one or more blocks of the flow diagrams, and combinations of blocks in the flow diagrams, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An apparatus configured to mitigate frequency drift, the apparatus comprising processing circuitry and at least one memory including computer program code, the at least one memory and the computer program code configured to, with the processing circuitry, cause the apparatus at least to:
model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock, wherein modeling the base station clock with respect to the receiver clock comprises generating a modeling filter for the base station clock and, in response to receiving an observation of clock information from the base station clock, updating the modeling filter based on the observation of clock information from the base station clock, and wherein the modeling filter is at least one of a non-Gaussian generalized variational inference (GVI)-based filter or an adaptive filter;
based on modeling the base station clock with respect to the receiver clock, generate at least one timing offset of the receiver clock with respect to the base station clock, wherein, in response to receiving the observation of clock information from the base station clock, generating the at least one timing offset comprises generating the at least one timing offset further based on the observation of clock information from the base station clock and also based on the modeling filter; and
determine a position of a user equipment (UE) associated with the receiver clock based at least partially upon the at least one timing offset.

2. The apparatus of claim 1, wherein the modeling filter is a Bayesian filter.

3. The apparatus of claim 2, wherein the Bayesian filter is an extended Kalman filter (EKF).

4. The apparatus of claim 1, wherein the at least one memory and the computer program code are further configured to, with the processing circuitry, cause the apparatus to:
initialize the clock offset based on an observed value.

5. The apparatus of claim 1, wherein the at least one memory and the computer program code are further configured to, with the processing circuitry, cause the apparatus to:
in response to determining a base station associated with the base station clock has transitioned from an available state to an unavailable state, store a filter state including the frequency drift and the clock offset in association with an identifier for the base station.

6. The apparatus of claim 5, wherein the at least one memory and the computer program code are further configured to, with the processing circuitry, cause the apparatus to:
in response to determining a base station associated with the base station clock has transitioned from the unavailable state to the available state, restore a filter state for modeling the base station clock with respect to the receiver clock based upon the filter state that has been stored including the frequency drift and the clock offset.

7. The apparatus of claim 1, wherein the at least one memory and the computer program code are further configured to, with the processing circuitry, cause the apparatus to:
separately model each of a plurality of base stations with respect to the receiver clock based upon a frequency drift and a clock offset between the base station clock of a respective base station of the plurality of base stations and the receiver clock in order to provide the floating frequency domain to compensate for the frequency drift between the base station clock of the respective base station and the receiver clock; and
based on separately modeling the base station clock of each of the plurality of base stations with respect to the receiver clock, separately generate at least one timing offset of the receiver clock for each of the plurality of base stations, wherein each of the at least one timing offset of the receiver clock is generated with respect to the base station clock of a corresponding one of the plurality of base stations.

8. The apparatus of claim 7, wherein the position of the UE associated with the receiver clock is determined based at least partially upon the at least one timing offset for each of the plurality of base stations.

9. A method for mitigating frequency drift, comprising:
modeling a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock, wherein modeling the base station clock with respect to the receiver clock comprises generating a modeling filter for the base station clock and, in response to receiving an observation of clock information from the base station clock, updating the modeling filter based on the observation of clock information from the base station clock, and wherein the modeling filter is at least one of a non-Gaussian generalized variational inference (GVI)-based filter or an adaptive filter;
based on modeling the base station clock with respect to the receiver clock, generating at least one timing offset of the receiver clock with respect to the base station clock, wherein, in response to receiving the observation of clock information from the base station clock, generating the at least one timing offset comprises generating the at least one timing offset further based on the observation of clock information from the base station clock and also based on the modeling filter; and determining a position of a user equipment (UE) associated with the receiver clock based at least partially upon the at least one timing offset.

10. The method of claim 9, wherein the modeling filter comprises a Bayesian filter.

11. The method of claim 9, wherein the modeling filter is an extended Kalman filter (EKF).

12. The method of claim 9, further comprising:
initializing the clock offset based on an observed value.

13. The method of claim 9, further comprising:
in response to determining a base station associated with the base station clock has transitioned from an available state to an unavailable state, storing a filter state including the frequency drift and the clock offset in association with an identifier for the base station.

14. The method of claim 13, further comprising:
in response to determining a base station associated with the base station clock has transitioned from the unavailable state to the available state, restoring a filter state for modeling the base station clock with respect to the receiver clock based upon the filter state that has been stored including the frequency drift and the clock offset.

15. The method of claim 9, further comprising:
separately modeling each of a plurality of base stations with respect to the receiver clock based upon a frequency drift and a clock offset between the base station clock of a respective base station of the plurality of base stations and the receiver clock in order to provide the floating frequency domain to compensate for the frequency drift between the base station clock of the respective base station and the receiver clock; and
based on separately modeling the base station clock of each of the plurality of base stations with respect to the receiver clock, separately generating at least one timing offset of the receiver clock for each of the plurality of base stations, wherein each of the at least one timing offset of the receiver clock is generated with respect to the base station clock of a corresponding one of the plurality of base stations.

16. The method of claim 15, wherein the position of the UE associated with the receiver clock is determined based at least partially upon the at least one timing offset for each of the plurality of base stations.

17. A computer program product for mitigating frequency drift, the computer program product comprising at least one non-transitory computer-readable storage medium having computer-executable program code instructions stored therein, the computer-executable program code instructions comprising program code instructions configured to:

model a base station clock with respect to a receiver clock so as to define the receiver clock at least partially based upon a frequency drift and a clock offset between the base station clock and the receiver clock in order to provide a floating frequency domain to compensate for the frequency drift between the base station clock and the receiver clock, wherein modeling the base station clock with respect to the receiver clock comprises generating a modeling filter for the base station clock and, in response to receiving an observation of clock information from the base station clock, updating the modeling filter based on the observation of clock information from the base station clock, and wherein the modeling filter is at least one of a non-Gaussian generalized variational inference (GVI)-based filter or an adaptive filter;

based on modeling the base station clock with respect to the receiver clock, generate at least one timing offset of the receiver clock with respect to the base station clock, wherein, in response to receiving the observation of clock information from the base station clock, generating the at least one timing offset comprises generating the at least one timing offset further based on the observation of clock information from the base station clock and also based on the modeling filter; and determine a position of a user equipment (UE) associated with the receiver clock based at least partially upon the at least one timing offset.

* * * * *